United States Patent [19]

Prast et al.

[11] 4,018,552
[45] Apr. 19, 1977

[54] PRESSING BLOCK FOR DIE PRESSING THERMOPLASTIC MATERIAL

[75] Inventors: Gijsbert Prast; Andries Mijnheer; Jan Mulder, all of Eindhoven, Netherlands

[73] Assignee: U.S. Philips Corporation, New York, N.Y.

[22] Filed: Nov. 5, 1975

[21] Appl. No.: 629,146

[30] Foreign Application Priority Data

Nov. 27, 1974 Netherlands ...................... 7415442

[52] U.S. Cl. .............................. 425/407; 425/810; 425/384; 249/80
[51] Int. Cl.² ..................... B29D 17/00; B29C 3/00
[58] Field of Search .......... 425/407, 810, 354, 385, 425/389, 390; 249/79, 80

[56] References Cited

UNITED STATES PATENTS

| | | | |
|---|---|---|---|
| 2,510,907 | 6/1950 | Renaud | 249/79 |
| 3,081,488 | 3/1963 | Casavina et al. | 249/79 X |
| 3,918,875 | 11/1975 | Phillipson et al. | 425/810 |
| 3,941,547 | 3/1976 | Hunyar et al. | 425/810 |

OTHER PUBLICATIONS

"Polyimides," from p. 65 of book, *Plastics*, by Der Bois and John, 1967, Reinhold Pub. Corp., N. Y.

*Primary Examiner*—J. Howard Flint, Jr.
*Attorney, Agent, or Firm*—Frank R. Trifari; David R. Treacy

[57] ABSTRACT

A pressing block for a phonograph or video record press in which ducts for cooling and heating media for the die are formed by a thin layer of a porous heat-conducting material provided between two thin metal sheets and bonded thereto. The assembly is connected on its side remote from the die to a supporting element of at least partially heat-insulating material.

7 Claims, 2 Drawing Figures

PRESSING BLOCK FOR DIE PRESSING THERMOPLASTIC MATERIAL

The invention relates to a die-pressing device for manufacturing articles consisting of a thermoplastic material, in such as phonograph records and video records; and more particularly, to oppositely arranged pressing blocks each supporting a die during operation, each pressing block being provided with ducts for heating and cooling media for the relevant die.

In known die-pressing devices of the above type for phonograph records, die-pressing is normally carried out at a temperature between approximately 150 and 180° C.

For alternate heating and cooling of the dies, steam or water is frequently used, both at a pressure level in the order of magnitude of, for example, 10 atmospheres.

To permit rapid heating and cooling of the die, good heat transfer between the heating and cooling medium, respectively, in the ducts and the die is of great importance.

It is the object of the invention to provide a structurally simple and cheap die-pressing device in which, due to an improved heat transfer between die and heating and cooling medium, respectively, in the ducts, the heating and cooling times of the die are reduced to a considerable extent.

The die-pressing device according to the invention is characterized in that the ducts of a double-walled assembly are formed by a thin layer of a porous heat-conducting material arranged between and bonded to the inner walls of two thin metal sheets, one of which sheets at its outer wall supports the die while the outer wall of the other sheet is connected to a supporting element for receiving pressure loads during pressing.

By using the porous layer, a fine system of ducts of a low flow resistance is obtained in which a good heat contact of heating and cooling medium, respectively, with the heat-conducting material of the porous layer is obtained over a large wall area of said material. As a result of the connection of the porous layer to the two metal sheet walls, not only a good heat contact between the porous layer and the sheet supporting the die is ensured, but also a mechanically rigid construction is realized. When during pressing the porous layer is pressurized in the open condition of the dies, in which cooling or heating medium under a pressure of approximately 10 atmospheres flows through the ducts, the porous layer absorbs the resulting tensile load because of the bonding to the sheets.

In the case of pressure load of a sheet supported in two places, bending is directly proportional to the third power of the distance between the supporting points. Since only a given maximum bending is permissible, this means that in the case of large distances of the supporting points, thick sheets are required. Since, however, the mutual distances in the present case between adjacent connection points of the porous layer to the sheets are very small, the important advantage is obtained that the sheets may be constructed to be very thin.

Since the heat resistance and the heat capacity of the thin metal sheets present between the porous layer and die are low, the die can be heated to the pressing temperature with a small amount of thermal energy.

The porous layer of heat-conducting material preferably consists of metal gauze, for example phosphor bronze gauze, which can be bonded, for example, to the metal sheets by soldering. The porous layer may also consist, for example, of metal spheres.

The porous layer preferably has a thickness between 0.5 and 1 mm.

The metal sheets may be constructed, for example, from steel, stainless steel, nickel, copper or copper alloys.

The metal sheets preferably have a thickness which is at most 3 mm.

In a favourable embodiment of the die-pressing device according to the invention at least the part of the supporting element engaging the metal sheet is manufactured from a heat-insulating material.

This means that only small masses need be heated and cooled, which involves a further considerable saving of energy and costs and even more reduces the heating and cooling times.

The heat-insulating material preferably consists of a reinforced synthetic material, in particular polyimide with glass fibres, which is light-weight and extremely suitable for the present purpose due to its good mechanical rigidity and thermal resistance.

The invention will now be described in greater detail with reference to the drawing which shows diagrammatically and not to scale two embodiments of a pressing block for phonograph records.

Figure 1:
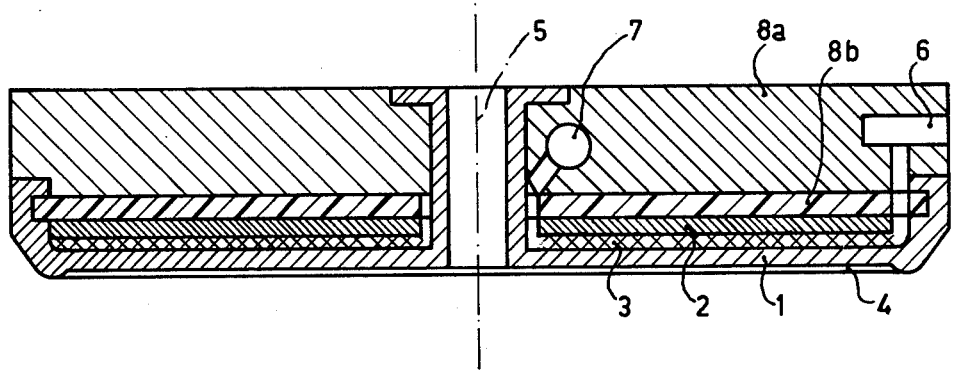
FIG. 1 is a cross-sectional view of a pressing block according to the invention.

The pressing block shown in FIG. 1 comprises two thin steel sheets 1 and 2, each approximately 2 mm thick, between which phosphor bronze gauze 3 is present which is soldered to the two sheets 1 and 2 and has a layer thickness of approximately 1 mm. In order to secure the gauze to the steel sheets, said sheets have first been provided with a layer of silver by electro-plating. The assembly of sheets and gauze is then placed in a vacuum furnace and heated under pressure so that the soldered hand is effected. As a result of the many spot-solderings, a strong construction is obtained.

Sheet 1 is provided with a die 4 having a surface profile corresponding to the phonograph record to be pressed.

The pressing block furthermore comprises a central bore 5 for a centering pin, not shown, for centering and securing the die.

Communicating with the system of ducts which is present in the gauze layer 3 are an inlet 6 and an outlet 7 for steam and water, respectively.

Finally the pressing block comprises a supporting element which is constructed from two portions 8a and 8b for receiving the pressure load acting on the pressing block during pressing.

Portion 8a is of steel and portion 8b is of polyimide reinforced with glass fibres which, as a heat insulator, insulates portion 8a thermally from the assembly of the metal sheets 1, 2 and the gauze layer 3. Hence portion 8a is not subjected to the heating and cooling process to which the die 4 is subjected. Therefore, a much smaller heating and cooling capacity, respectively, will suffice, while the heating and cooling times of the assembly of thin sheets and gauze layer with its excellent heat transfer and low heat capacity are very short.

Figure 2:
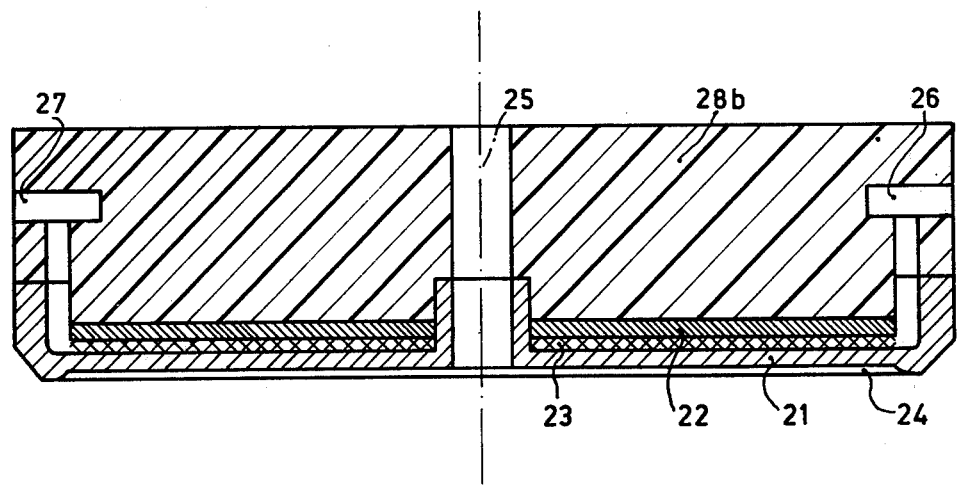
FIG. 2 is a cross-sectional view of another embodiment of a pressing block according to the invention.

The pressing block shown in FIG. 2 is in outline the same as that of FIG. 1. For corresponding components the same reference numerals are used as in FIG. 1 but increased by the number 20.

The essential difference from the pressing block shown in FIG. 1 is that in the present case the supporting element consists only of one portion 28b which is manufactured entirely from a heat insulating synthetic material.

What is claimed is:

1. A pressing block for die pressing thermoplastic material, comprising
a supporting element;
a double-walled assembly, having a first wall connected to the supporting element for receiving a pressure load during pressing, and a second wall arranged to support a die for pressing, wherein said assembly comprises a thin layer of porous heat conducting material, and said first and second walls are formed by first and second thin metal sheets bonded to respective sides of the thin layer; and
means for conducting pressurized heating and cooling media to said thin layer for flow through said layer.

2. A pressing block as claimed in claim 1 wherein said heat conducting material consists of metal spheres.

3. A pressing block as claimed in claim 1 wherein said heat conducting material consists of metal gauze.

4. A pressing block as claimed in claim 3 wherein said gauze is bonded to said sheets by solder.

5. A pressing block as claimed in claim 3 wherein said thin layer has a thickness between 0.5 and 1 mm, and said metal sheets have each a thickness at the most equal to 3 mm.

6. A pressing block as claimed in claim 5, wherein at least a part of the supporting element engaging said first wall is made of reinforced synthetic heat-insulating material.

7. A pressing block as claimed in claim 6 wherein said heat-insulating material is glass reinforced polyimide.

* * * * *